United States Patent
Krasznai et al.

(10) Patent No.: US 8,733,575 B2
(45) Date of Patent: May 27, 2014

(54) FOOD PROCESSOR BOWL COVER DYNAMIC SEALING ASSEMBLY

(75) Inventors: Charles Z Krasznai, Bridgeport, CT (US); Joseph J Laskowski, Derby, CT (US); David J Wanat, Meridan, CT (US); James A Sandor, Trumbull, CT (US)

(73) Assignee: Conair Corporation, Stamford, CT (US)

( * ) Notice: Subject to any disclaimer, the term of this patent is extended or adjusted under 35 U.S.C. 154(b) by 472 days.

(21) Appl. No.: 12/883,997

(22) Filed: Sep. 16, 2010

(65) Prior Publication Data

US 2011/0079596 A1    Apr. 7, 2011

Related U.S. Application Data

(60) Provisional application No. 61/243,826, filed on Sep. 18, 2009.

(51) Int. Cl.
*B65D 51/00*    (2006.01)

(52) U.S. Cl.
USPC ............................ 220/212; 220/378; 241/37.5

(58) Field of Classification Search
USPC .................................. 220/212, 378; 241/37.5
See application file for complete search history.

(56) References Cited

U.S. PATENT DOCUMENTS

| 4,153,172 A * | 5/1979 | Bialobrzeski ................. 215/209 |
| 2007/0181720 A1 * | 8/2007 | Mauch et al. .................... 241/92 |

* cited by examiner

*Primary Examiner* — Anthony Stashick
*Assistant Examiner* — James N Smalley
(74) *Attorney, Agent, or Firm* — McCormick Paulding & Huber LLP

(57) ABSTRACT

A food processor bowl 1 has a pouring lip 2, a sidewall 4, a handle 5, a floor 6 and bowl neck 7 with an opening 3. The bowl 1 has an upper rim 8 and pair of hinge slots 9, 10 adapted to receive corresponding hinge pins 17, 18 that are attached to the cover 13. The bowl neck 7 is adapted to receive a driven motor shaft (not shown) through its opening 3. A conventional blade assembly (not shown) is mounted to the driven shaft to rotate therewith in order to chop and mix food product.

4 Claims, 3 Drawing Sheets

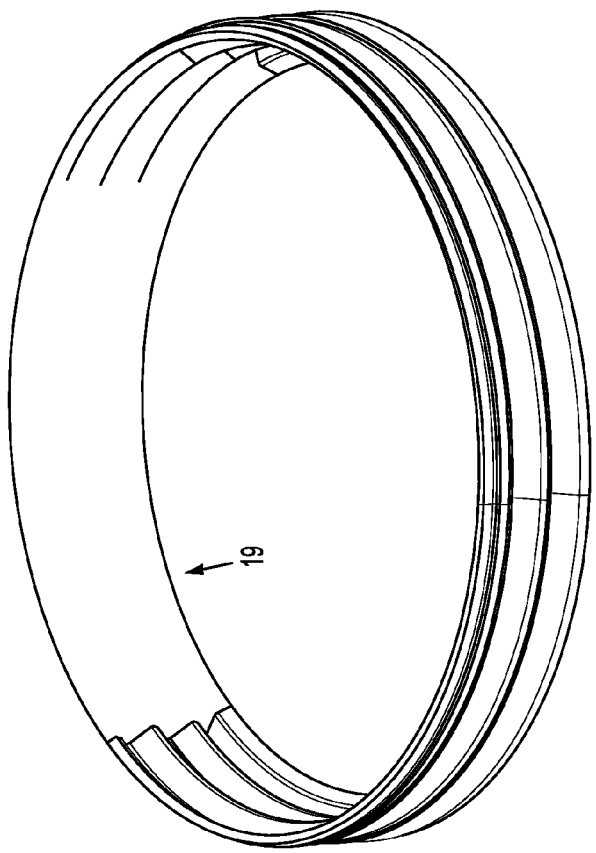
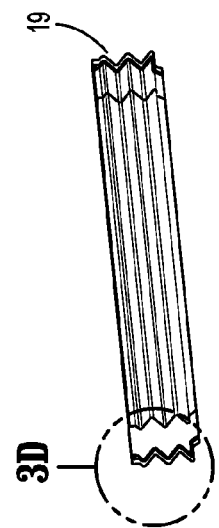
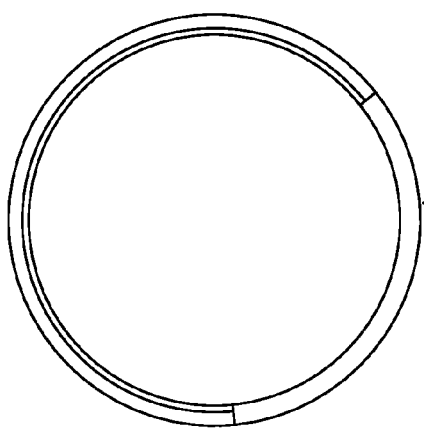
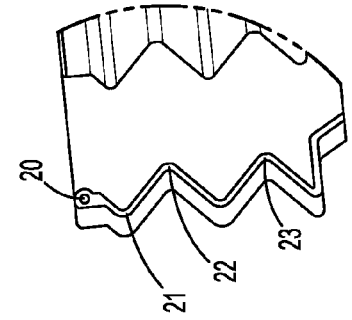
FIG. 3A
FIG. 3C
FIG. 3B
FIG. 3D

FOOD PROCESSOR BOWL COVER DYNAMIC SEALING ASSEMBLY

RELATED APPLICATIONS

The present application is related to and claims priority from U.S. Provisional Application 61/243,826.

BACKGROUND OF THE INVENTION

The present invention relates to food preparation appliances and, more particularly, to countertop food processor appliances.

DESCRIPTION OF RELATED ART

Countertop food processor appliances generally comprise a base, a motor housed in the base, a bowl mounted on the base for receiving food product to be mixed or chopped, a blade rotationally driven by the motor and positioned in the bowl for rotation therein, and a cover or lid for the bowl. An electrical cord extends from the base and is adapted to be plugged into an external electrical source such as a wall socket to deliver electrical energy to the motor.

Countertop food processors typically include a lid that must be locked into place on the bowl in order to activate a switch enabling operation of the motor. This is a safety precaution, though certain sizes and configurations of food processor are inherently safe without such locking a switching arrangement. Another reason lit is desirable to lock lids to food processor bowls is to store and protect food contents inside a bowl without the possibility of the lid falling off or opening. Because of the rigid nature and fixed size of food processor bowls and, if applicable, the locking and switching mechanisms that are part of such bowls, it is necessary for each bowl to have its own lid in order to achieve a secure locking fit. It would be convenient and efficient, however, to provide a single lid that functionally covers more than one size bowl, particularly a plurality of bowls that are nested during use with a food processors.

OBJECT OF THE PRESENT INVENTION

It is an object of the present invention to provide a food processor bowl cover sealing assembly that enables a single lid to functionally cover more than one size bowl, particularly a plurality of bowls that are nested during use with a food processors.

SUMMARY OF THE INVENTION

According to the present invention, a lid adapted to cover a food processor bowl has a flexible sealing ring that is mounted to a lower surface of the lid, along the perimeter. The sealing ring has folds that flex in a bellows fashion so that it may be compressed vertically and will return to original shape by the material's spring force. Thus, during use, it will compress and relax in order to provide a downwardly biased force between the sealing ring and the upper lip of a bowl to which the lid is mounted.

BRIEF DESCRIPTION OF THE DRAWING

FIG. 3A is a partial, perspective view of a seal according to a first preferred embodiment of the invention.

FIG. 3B is a partial, top view of a seal according to a first preferred embodiment of the invention.

FIG. 3C is a partial, side view of a seal according to a first preferred embodiment of the invention.

FIG. 3D is an enlarged, detail view of area 3D of FIG. 3C.

DESCRIPTION OF THE PREFERRED EMBODIMENT OF THE PRESENT INVENTION

Figure 1A:
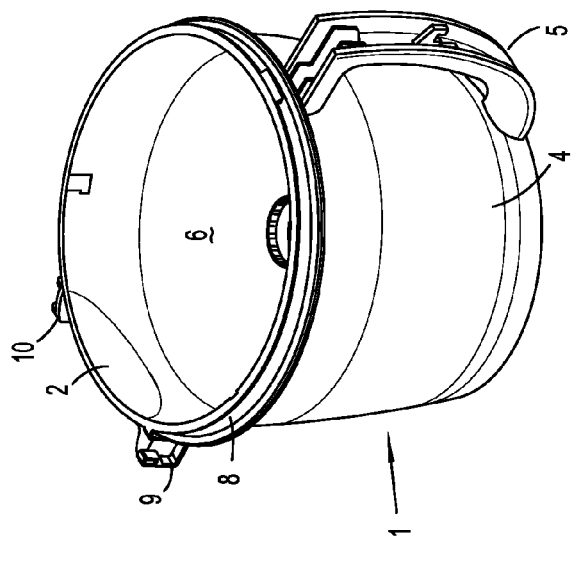
FIG. 1A is a perspective view of a bowl according to a first preferred embodiment of the invention.
Figure 1B:
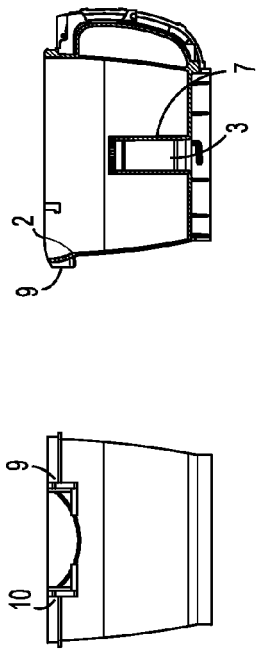
FIG. 1B is a side view of a bowl according to a first preferred embodiment of the invention.
Figure 1C:
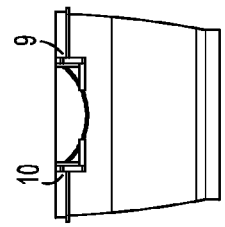
FIG. 1C is a front view of a bowl according to a first preferred embodiment of the invention.
Figure 1G:
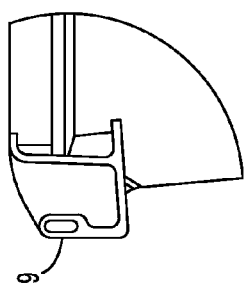
FIG. 1G is a partial, side view of a bowl according to a first preferred embodiment of the invention.
Figure 1E:
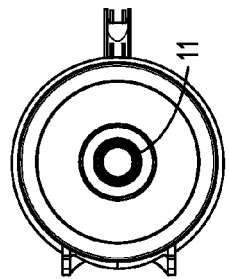
FIG. 1E is a bottom view of a bowl according to a first preferred embodiment of the invention.
Figure 1F:
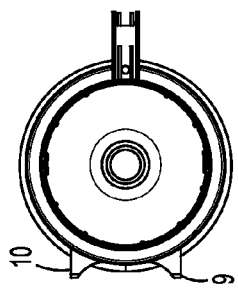
FIG. 1F is a top view of a bowl according to a first preferred embodiment of the invention.
Figure 1D:
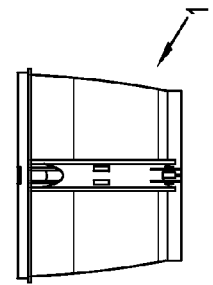
FIG. 1D is a rear view of a bowl according to a first preferred embodiment of the invention.
Figure 2A:
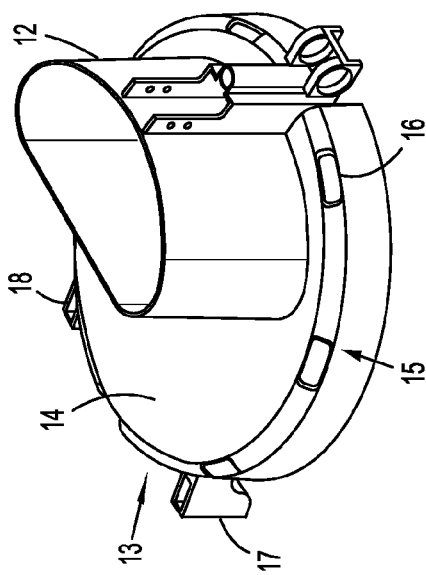
FIG. 2A is a perspective view of a cover according to a first preferred embodiment of the invention.
Figure 2F:
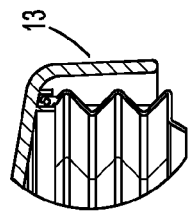
FIG. 2F is a partial, side view of a cover according to a first preferred embodiment of the invention.
Figure 2E:
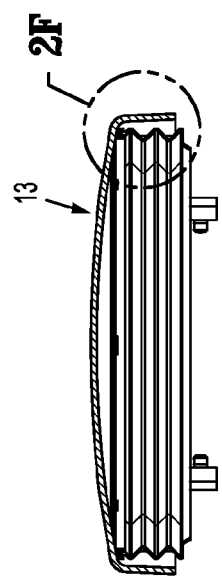
FIG. 2E is a side view of a cover according to a first preferred embodiment of the invention.
Figure 2B:
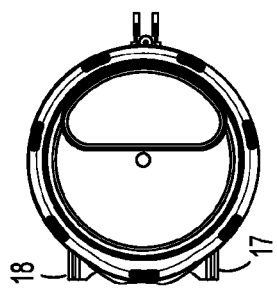
FIG. 2B is a top view of a cover according to a first preferred embodiment of the invention.
Figure 2D:
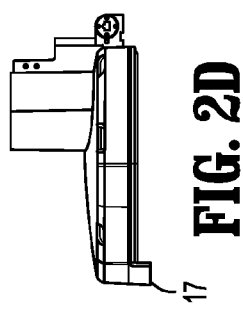
FIG. 2D is a side view of a cover according to a first preferred embodiment of the invention.
Figure 2C:
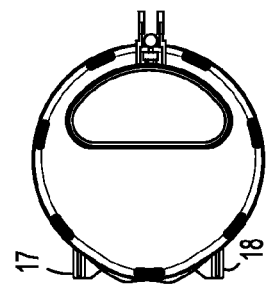
FIG. 2C is a bottom view of a cover according to a first preferred embodiment of the invention.

Referring to the Drawing Figures, according to the present invention a food processor bowl 1 comprises a pouring lip 2, a sidewall 4, a handle 5, a floor 6 and bowl neck 7 with an opening 3. The bowl 1 has an upper rim 8 and pair of hinge slots 9, 10. Each hinge slot extends radially from the outside diameter of the bowl 1. They are adapted to receive corresponding hinge pins 17, 18 that are attached to the cover 13. The bowl neck 7 is adapted to receive a driven motor shaft (not shown) through its opening 3, as is conventionally known. A conventional blade assembly (not shown) is mounted to the driven shaft to rotate therewith in order to chop and mix food product.

A cover 13 comprises a chute 12, a flat portion 14, a circumferential wall 15, drainage holes 16, and hinge pins 17, 18. The cover 13 is adapted to attach to the top of the bowl 1 during use. The chute 12 is adapted to enable food product to be introduced into the bowl 1 while the cover 13 is on and in a closed position, as is known generally. The drainage holes 16 enable water and debris to drain through during cleaning, including dishwasher cleaning. The drainage holes 16 are not functional during food processing operations, as they are isolated from the food product by the seal (described below). The hinge pins 17, 18 correspond to and cooperate with the hinge slots 9, 10 on the bowl 1 so that the cover 13 can be removably mounted on the bowl 1 and, while mounted, can be hingedly opened and closed relative to the bowl 1. A conventional latch mechanism (not shown) can be provided on the cover 13 opposite the hinges 13 in order to lock the cover 13 closed when locking is desired.

A ring-shaped, bellows seal 19 is attached to the underside of the cover 13. The seal 19 has a circumference that is generally the same as the bowl 1. Thus, when the cover 13 is closed, the underside of the seal 19 contacts the upper rim 8 of the bowl 1. The closing of the cover 13 relative to the bowl 1 compresses the seal 19 between the two.

FIGS. 3A-3C illustrate the seal 19. In these Drawing Figures the bellows features, 21-23, are intentionally removed from sections of the seal 19 for illustrative purposes. They are continuous, in 360 degree fashion. The bellows shape and material selection of the seal 19 give it spring properties so that will compress vertically and then return to shape when released. This permits the seal to by used in this manner with various bowl configurations. For example, a user may use bowls of different heights, or a plurality of nested bowls, where each different configuration might result in a different rim height. Despite this variation in rim height, the seal 19 accommodates each bowl and seals. The seal 19 is made of a flexible material such as, for example, silicone or urethane. A steel reinforcing wire 20 may be embedded or attached to the seal for added strength. The seal 19 may be attached to the cover 13 by a snap ring or other means. The seal 19 has a plurality of accordion-like folds, 21-23.

While the preferred embodiment of the present invention has been disclosed herein, it is understood that various modification can be made without departing from the scope of the presently claimed invention.

What is claimed is:

1. A food processor bowl cover sealing assembly that enables a single lid to functionally cover a plurality of food processor bowls of varying sizes when used either alone or used simultaneously in nested fashion, said assembly comprising
    a lid adapted to cover a food processor bowl;
    a flexible sealing ring that is mounted to a lower surface of said lid, along the perimeter of said lid, said sealing ring being adapted to contact and compress against the upper lip of a food processor bowl;
    a plurality of folds in said sealing ring, said folds adapted to flex in a bellows fashion so that it may be compressed vertically and will return to original shape, when released from compression, by the material's spring force; and
    said lid comprising a food chute, a flat portion, a circumferential wall, drainage holes, and hinge pins, said cover being adapted to open and close in a pivoting manner by connecting said hinge pins to corresponding hinge pin receiving slots on said bowl.

2. An assembly according to claim 1, wherein said sealing ring and said bowl have approximately equal diameter dimensions.

3. An assembly according to claim 1, wherein said sealing ring is made of a flexible material.

4. An assembly according to claim 3, further comprising a steel reinforcing wire embedded in said sealing ring.

* * * * *